United States Patent
Kismarton et al.

(10) Patent No.: US 10,131,417 B2
(45) Date of Patent: Nov. 20, 2018

(54) HYBRID CARBON/FIBERGLASS STRUCTURAL COMPONENT FOR AN AIRCRAFT

(71) Applicant: The Boeing Company, Chicago, IL (US)

(72) Inventors: Max U. Kismarton, Renton, WA (US); Devin E. Knowles, Kenmore, WA (US); Francis E. Andrews, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/495,152

(22) Filed: Apr. 24, 2017

(65) Prior Publication Data

US 2018/0304983 A1    Oct. 25, 2018

(51) Int. Cl.
| | | |
|---|---|---|
| *B32B 5/12* | (2006.01) | |
| *B64C 1/18* | (2006.01) | |
| *B64C 1/06* | (2006.01) | |
| *D01F 9/12* | (2006.01) | |
| *C03C 13/00* | (2006.01) | |
| *B64C 1/00* | (2006.01) | |

(52) U.S. Cl.
CPC ............... *B64C 1/18* (2013.01); *B64C 1/06* (2013.01); *C03C 13/00* (2013.01); *D01F 9/12* (2013.01); *B32B 5/12* (2013.01); *B64C 2001/0072* (2013.01); *Y10T 428/192* (2015.01); *Y10T 428/195* (2015.01); *Y10T 428/197* (2015.01); *Y10T 428/24099* (2015.01); *Y10T 428/24116* (2015.01); *Y10T 428/24124* (2015.01)

(58) Field of Classification Search
CPC ............ Y10T 428/192; Y10T 428/195; Y10T 428/197; Y10T 428/24099; Y10T 428/24116; Y10T 428/24124; B32B 5/12; B32B 2262/101; B32B 2262/106; B64C 1/064; B64C 2001/0072
See application file for complete search history.

(56) References Cited

U.S. PATENT DOCUMENTS

| | | | |
|---|---|---|---|
| 4,539,253 A | 9/1985 | Hirschbuehler | |
| 4,892,774 A | 1/1990 | Vallance | |
| 4,954,382 A | 9/1990 | Riefler | |
| 5,122,226 A | 6/1992 | Minford | |
| 8,128,100 B2 | 3/2012 | Bogue | |
| 2004/0213952 A1* | 10/2004 | Takemura | B29C 70/34 428/105 |
| 2006/0219845 A1 | 10/2006 | Kismarton | |
| 2011/0244250 A1 | 10/2011 | Simmons | |

* cited by examiner

*Primary Examiner* — Alexander S Thomas
(74) *Attorney, Agent, or Firm* — Joseph M. Rolnicki; Evans & Dixon, LLC

(57) ABSTRACT

A hybrid carbon/fiberglass structural component or beam for an aircraft is constructed with layers of strips of glass fibers interspersed with layers of strips of unidirectional carbon fibers where the carbon fibers are oriented only in alignment with or along the longitudinal direction of the length of the beam thereby adding strength and stiffness to the beam while reducing weight and manufacturing costs.

20 Claims, 6 Drawing Sheets

HYBRID CARBON/FIBERGLASS STRUCTURAL COMPONENT FOR AN AIRCRAFT

FIELD

This disclosure pertains to a hybrid carbon/fiberglass structural component for an aircraft. More specifically, this disclosure pertains to a hybrid carbon/fiberglass aircraft floor beam.

BACKGROUND

Current constructions of aircraft structural components, for example aircraft floor beams that are constructed from strips of composite material are very expensive to manufacture. These materials include strips of composite material such as carbon fiber tape and carbon fiber fabric. Some aircraft floor beams are constructed of 100% carbon fiber. Strips of unidirectional carbon fiber are layered upon each other along the longitudinal length of the beam with the unidirectional carbon fibers in the strips being oriented at 0°, −45°, +45° and 90° relative to the longitudinal length of the beam. A significant amount of the manufacturing costs is due to the materials used in the construction of the floor beam.

Aircraft beams constructed of aluminum are less expensive to manufacture. However, they have substantial weight, and are prone to corrosion.

Additionally, the attachment of an aircraft beam constructed of strips of carbon fiber to a metal structure of the aircraft can lead to galvanic corrosion in the metal structure. To use an intermediate attachment between the carbon fiber beam and the metal structure, for example an attachment made from titanium is expensive and can lead to complex and heavy joints between the carbon fiber beam and the metal structure. Additionally, drilling of the carbon fiber beam to produce fastener holes to attach the intermediate attachment to the beam produces conductive dust of carbon that can contaminate manufacturing equipment and components of the aircraft.

SUMMARY

The hybrid carbon/fiberglass structural component of this disclosure, for example an aircraft floor beam, is constructed in a way that reduces the cost of manufacturing the beam. This is accomplished by replacing some of the strips of carbon fiber in the beam construction with strips of fiberglass. The novelty in the construction of the beam is in replacing strips of carbon fiber that are not needed to achieve the required stiffness or bending resistance of the beam, with strips of fiberglass.

The strips of carbon fiber comprised of unidirectional carbon fibers are oriented in alignment with the length of the beam or at a 0° angle relative to the length of the beam. These strips provide the bending strength and stiffness to the length of the beam. This is more so than strips of carbon fiber comprised of unidirectional carbon fibers that are oriented at angles of +45°, −45° or 90° relative to the length of the beam. Strips of carbon fiber comprised of unidirectional carbon fibers that are oriented at angles of +45°, −45° or 90° relative to the length of the beam do not contribute much (5% or less) to the bending stiffness of the beam. These strips of carbon fibers are replaced with strips of glass fibers, resulting in a reduction of the beam weight and a reduction in the manufacturing costs of the beam. This is all achieved without sacrificing significant beam bending stiffness and strength provided by the strips of carbon fibers used in the beam construction that are comprised of unidirectional carbon fibers oriented along the length of the beam. The strips of composite material comprised of glass fibers are limited to areas of the beam that experience relatively low loads compared to the peak loads in the areas of the beam in which strips of composite material comprised of unidirectional carbon fibers oriented along the length of the beam are used.

To avoid galvanic corrosion of metal structures of the aircraft to which portions of the beam are attached, the strips of unidirectional carbon fibers are transitioned to strips of glass fibers by a co-cured splice. Because the fiberglass added at attachment areas of the beam is not galvanicly active, galvanic corrosion of metal structures in the aircraft to which the beam is attached is avoided. Additionally, drilling a fiberglass/aluminum joint in the metal structure of the aircraft is a much easier manufacturing procedure than drilling a carbon/titanium joint.

The structural component for an aircraft, or floor beam of this disclosure has a length extending in a longitudinal direction between a first terminal end of the beam and a second terminal end of the beam. Additionally, the beam has a width that extends in a lateral direction across the beam.

The beam has an upper flange. The upper flange has a horizontal orientation and a length that extends between the first terminal end of the beam and the second terminal end of the beam. The upper flange has a width that extends across the width of the beam.

The beam has a lower flange. The lower flange has a horizontal orientation and a length that extends between the first terminal end of the beam and the second terminal end of the beam. The lower flange has a width that extends across the width of the beam.

The beam also has a central web. The central web has a vertical orientation and a length that extends between the first terminal end of the beam and the second terminal end of the beam. The central web has a height that extends between the upper flange and the lower flange.

The cross-section configuration of the beam of this disclosure could be a configuration of an I beam or a C channel. Other equivalent cross-section configurations could be used in the construction of the beam.

The beam is constructed of a first plurality of strips of composite material on the beam. The first plurality of strips of composite material extend along the length of the beam. The first plurality of strips of composite material are comprised of strips of glass fibers where the glass fibers are oriented at an angle relative to the length of the beam.

The beam is also constructed of a second plurality of strips of composite material on the beam. The second plurality of strips of composite material extend along the length of the beam. The second plurality of strips of composite material are comprised of strips of unidirectional carbon fibers where the carbon fibers are oriented in alignment with the length of the beam.

The beam is also constructed of a third plurality of strips on the beam. The third plurality of strips of composite material are adjacent the first terminal end of the beam and the second terminal end of the beam. The third plurality of strips of composite material are comprised of strips of glass fibers that are each connected by a splice to the strips of unidirectional carbon fibers adjacent the first terminal end of the beam and the second terminal end of the beam. The third plurality of strips thereby shield the opposite ends of the strips of unidirectional carbon fibers from the exterior environment of the beam at the first terminal end of the beam and the second terminal end of the beam.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Further features of the hybrid carbon/fiberglass structural component for an aircraft are set forth in the following detailed description and drawing figures.

DETAILED DESCRIPTION

As stated earlier, current constructions of some aircraft floor beams are 100% carbon fiber. The floor beams are constructed of strips of pre-preg carbon fiber with unidirectional carbon fibers oriented at 0°, +45°, −45° and 90° relative to the lengths of the strips of carbon fiber. It has been observed by the applicant that, the expensive strips of carbon fiber with unidirectional carbon fibers oriented at −45°, +45° and 90° do not offer significant bending resistance.

A strip of unidirectional carbon fiber with the carbon fibers oriented at 0° relative to the length of the strip has a modulus of elasticity of approximately 20 million psi and a density of approximately 0.05 lb/in$^3$. A comparably dimensioned strip of aluminum has a modulus of elasticity of approximately 10 million psi and a density of approximately 0.1 lb/in$^3$. Therefore, the strip of aluminum required to achieve the same stiffness is approximately four times heavier than the strip of unidirectional carbon fibers oriented at 0° relative to the length of the strip.

A comparably dimensioned strip of unidirectional carbon fibers where the carbon fibers are oriented at an angle of 90° relative to the length of the strip has a modulus of elasticity of 0.5 million. It has been observed by the applicants that a strip of unidirectional fibers oriented at 90° relative to the length of the strip, whether the fibers are carbon fibers or glass fibers does not contribute significantly to bending stiffness and strength.

Additionally, a strip of unidirectional fibers oriented at +45° or −45° relative to the length of the strip, whether unidirectional carbon fibers or glass fibers do not contribute significantly to the stiffness and strength of the strip.

As explained below, in the construction of the structural component for an aircraft of this disclosure, strips of unidirectional carbon fibers oriented at −45°, +45° or 90° relative to the length of the strip are replaced with strips of glass fibers with corresponding orientations. All strips of unidirectional carbon fibers with orientations of 0° relative to the lengths of the strips are maintained in the construction of the structural component for an aircraft.

Figure 1:
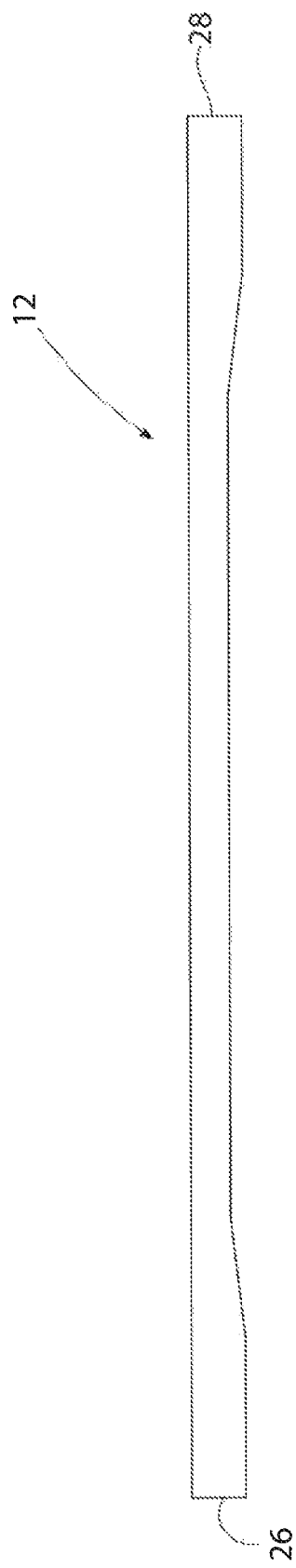
FIG. 1 is a representation of a side elevation view of a beam of this disclosure, the opposite side elevation view of the beam being a mirror image thereof.

FIG. 1 is a representation of the hybrid carbon/fiberglass structural component for an aircraft of this disclosure. The structural component 12 represented in FIG. 1 is a beam, and in particular a floor beam. Although a floor beam is described, it should be understood that the concepts of this disclosure can be applied to a variety of other structural elements and are not limited to floor beams. The beam 12 has a 20 foot longitudinal length, a vertical height of 5" and a lateral width of 6". However, the beam 12 could have other dimensions dependent on its intended use. The beam 12 has an eye-beam cross-section configuration represented in FIG. 2. However, the beam 12 could have other cross-section configurations.

Figure 2:
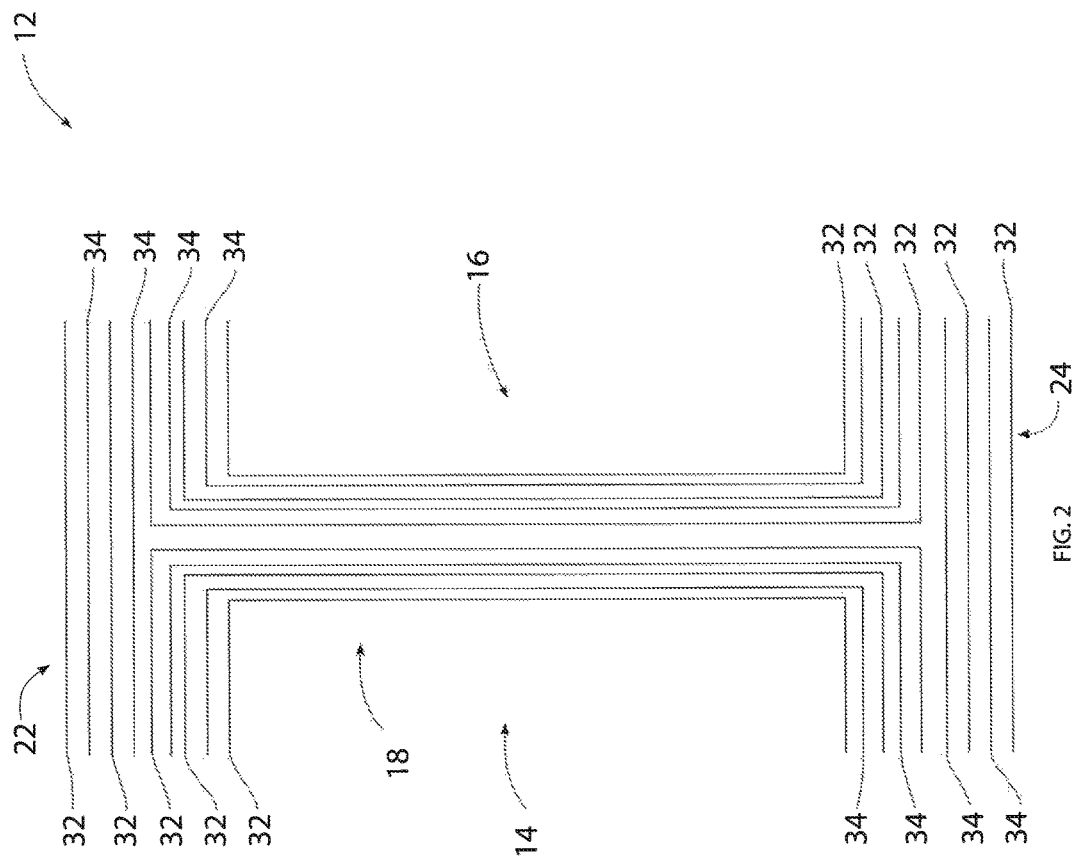
FIG. 2 is a representation of an enlarged, schematic view of a cross-section of the beam of FIG. 1.

Referring to FIG. 2, the beam 12 is constructed of two back to back C-shaped composite channels 14, 16. The two channels 14, 16 are each constructed of a plurality of pre-preg strips. As used herein, the word "strip" means one layer of a composite material tape or fabric. The two channels 14, 16 are brought together back to back to form the central web 18 of the beam 12, the upper flange 22 of the beam 12 and the lower flange 24 of the beam 12. The central web 18, the upper flange 22 and the lower flange 24 extend the longitudinal length of the beam 12 between a first terminal end 26 of the beam and a second terminal end 28 of the beam. By being terminal ends 26, 28 of the beam, no structure of the beam extends beyond the terminal ends 26, 28.

As represented in FIG. 2, the upper flange 22 of the beam 12 has a horizontal orientation and a length that extends between the first terminal end 26 of the beam and the second terminal end 28 of the beam. The upper flange 22 has a lateral width that extends across the width of the beam 12.

The lower flange 24 of the beam 12 has a horizontal orientation and a longitudinal length that extends between the first terminal end 26 of the beam and the second terminal end 28 of the beam. The lower flange 24 has a lateral width that extends across the width of the beam 12.

The central web 18 has a vertical orientation and a longitudinal length that extends between the first terminal end 26 of the beam and the second terminal end 28 of the beam. The central web 18 has a vertical height that extends between the upper flange 22 and the lower flange 24.

The beam 12 is constructed of a first plurality of strips 32 of pre-preg composite material on the beam 12. The first plurality of strips 32 of pre-preg composite material extend along the length of the beam. As represented in FIG. 2, the first plurality of strips 32 form portions of the length of the upper flange 22, portions of the length of the lower flange 24 and portions of the length of the central web 18. The first plurality of strips 32 of pre-preg composite material consists of strips of glass fibers or fiberglass. Some strips in the first plurality of strips 32 have glass fibers that are oriented at an angle relative to the length of the beam, for example at an angle of +45° relative to the longitudinal length of the beam. Some strips of the first plurality of strips 32 have glass fibers that are oriented at an angle of −45° relative to the longitudinal length of the beam. Still other strips of the first plurality of strips 32 have glass fibers that are oriented at an angle of 90° relative to the longitudinal length of the beam.

The beam 12 is also constructed of a second plurality of strips 34 of composite material on the beam. The second plurality of strips of composite material also extend along the length of the beam 12. The second plurality of strips of composite material 34 consists of strips of unidirectional carbon fibers where the carbon fibers are all oriented in alignment with the longitudinal length of the beam 12. The second plurality of strips 34 each has unidirectional carbon fibers that are oriented at 0° relative to the longitudinal directional of the length of the beam 12. No strips of the second plurality of strips 34 have carbon fibers that are oriented at an angle relative to the longitudinal directional of the length of the beam 12. The plurality of unidirectional carbon fibers in the second plurality of strips 34 are oriented only in the longitudinal directional along the length of the beam 12. The unidirectional carbon fibers of the second plurality of strips 34 being oriented along the longitudinal length of the beam 12 provide the bending strength and stiffness to the length of the beam. The unidirectional carbon fibers of the second plurality of strips 34 aligned with the longitudinal length of the beam 12 provide greater bending strength and stiffness to the beam than if the strips were comprised of unidirectional carbon fibers that were oriented at angles of +45°, −45° or 90° relative to the length of the beam.

In the construction of the beam 12, strips of the first plurality of strips 32 having glass fibers oriented at angles of +45°, −45° or 90° relative to the length of the beam 12 replace strips of carbon fiber that are comprised of unidirectional carbon fibers that are oriented at angles of +45°, −45° or 90° relative to the length of the beam. With the second plurality of strips of unidirectional carbon fibers 34 that are aligned with or extend along the longitudinal length of the beam 12 being the only strips of carbon fibers in the beam construction, the beam weight is reduced and the manufacturing cost of the beam is reduced. The replacement of the carbon fiber strips with glass fiber strips results in a reduction of the beam weight and a reduction of manufacturing costs of the beam. This is achieved without sacrificing the bending stiffness and strength of the beam 12 which is provided by the strips of carbon fibers used in the beam construction that are comprised of unidirectional carbon fibers 34 oriented along the length of the beam.

To avoid galvanic corrosion of metal structures of the aircraft to which portions of the beam 12 are attached, strips of glass fibers from the first plurality of strips 32 are layered on the exterior surfaces of the beam 12. This is represented in FIG. 2 where strips from the first plurality of strips of glass fibers 32 are applied over the opposite sides of the central web 18, the top surface of the upper flange 22 and the bottom surface of the lower flange 24. Thus, strips of glass fibers from the first plurality of strips 32 sandwich the second plurality of strips of unidirectional carbon fibers 34 within the beam and shield the second plurality of strips of unidirectional carbon fibers 34 from the exterior environment of the aircraft and from metal structures of the aircraft.

To further avoid galvanic corrosion of metal structures of the aircraft to which portions of the beams 12 are attached, the strips of unidirectional carbon fibers in the construction of the beam 12 are transitioned to strips of glass fibers by a co-cured splice between the strips of unidirectional carbon fibers and the strips of glass fibers.

Figure 3:
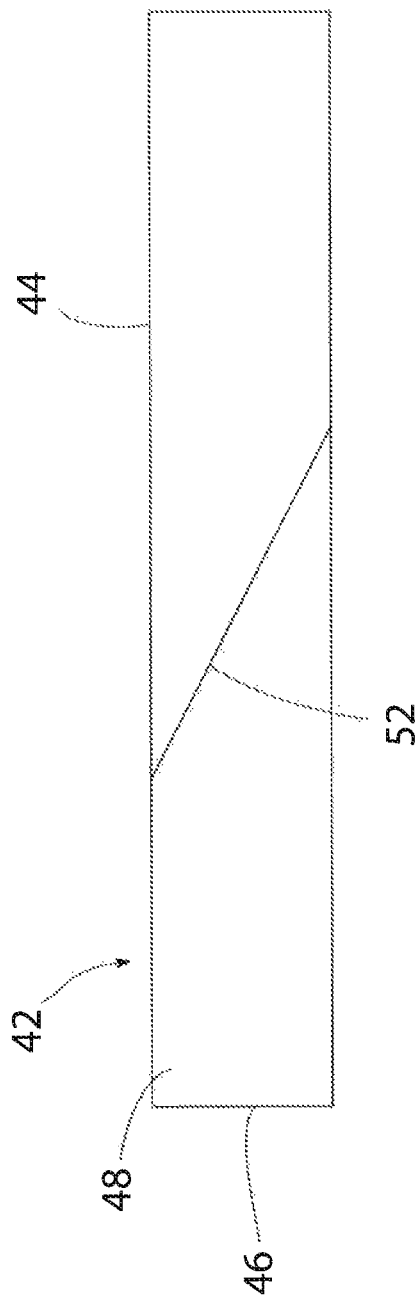
FIG. 3 is a schematic representation of one embodiment of an end of a carbon fiber strip of the beam of FIG. 1.

FIG. 3 is a representation of a modification to a first terminal end portion 42 of a strip of unidirectional carbon fibers 44 at the first terminal end 46 of the beam. Represented in FIG. 3, a small strip of glass fiber 48 is spliced to the strip of unidirectional carbon fiber 44 at the first terminal end portion 42 of the beam. The splice 52 joining the small strip of glass fiber 48 to the strip of unidirectional carbon fiber 44 at the first terminal end 46 of the beam is a single sided taper. The small strip of glass fiber 48 is spliced to the tapered end of the strip of unidirectional carbon fiber 44 along the tapered splice 52 and the strips are co-cured. This provides the small strip of glass fiber 48 to the end of the strip of unidirectional carbon fiber 44 at an end of the beam that is designed to be attached to a metal structure of an aircraft. Because the fiberglass strip 48 at the attached end of the beam is not galvanicly active, galvanic corrosion of metal structures in the aircraft to which the beam is attached is avoided.

Figure 4:
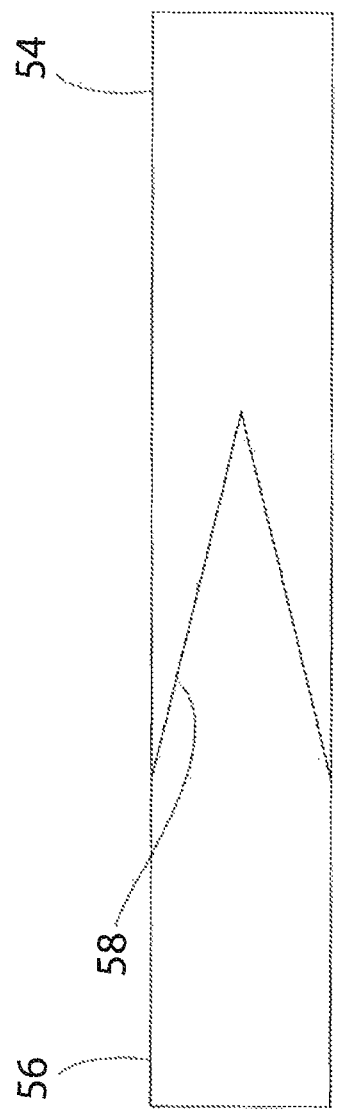
FIG. 4 is a schematic representation of another embodiment of one end of a carbon fiber strip of the beam of FIG. 1.

FIG. 4 is a further representation of a strip 54 of unidirectional carbon fiber transitioning to a small strip 56 of glass fiber along a splice 58. In FIG. 4, the splice 58 has a configuration of a double sided taper with the carbon of the strip of unidirectional carbon fiber 54 on the opposite side surfaces of the double sided taper splice 58. Again, the small strip of glass fiber 56 is abutted against the strip of unidirectional carbon fiber 54 along the double sided splice 58 and the strips are co-cured. This provides the fiberglass strip 56 to an attachment end of the beam where the fiberglass strip 56 is not galvanicly active and prevents galvanic corrosion of metal structures to which the beam end is attached.

Figure 5:
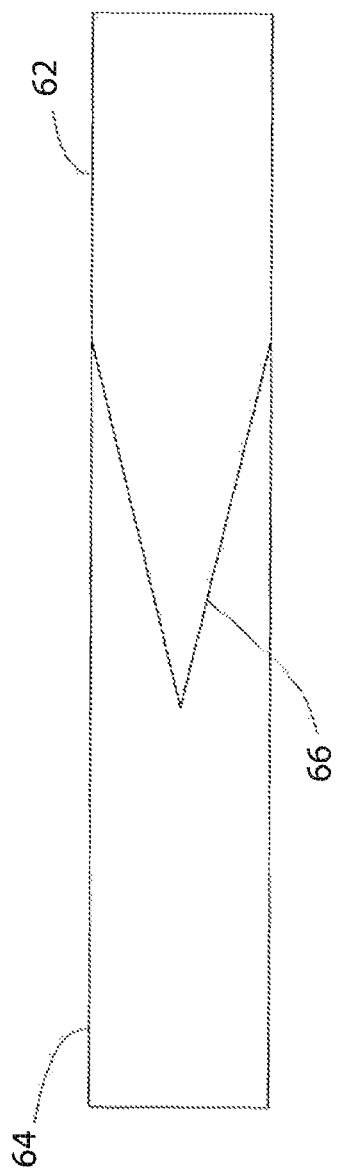
FIG. 5 is a schematic representation of a further embodiment of the end of a carbon fiber strip of the beam of FIG. 1.

FIG. 5 is a further representation of the end of a strip of unidirectional carbon fiber 62 being joined to a small strip of glass fiber 64 by a splice 66. The splice 66 is a double sided taper similar to that represented in FIG. 4, but with the glass fiber of the small strip of glass fiber 64 on opposite sides of the splice 66. Again, the small strip of glass fiber 62 is attached to the end of the strip of unidirectional carbon fiber 64 by the splice 66 being co-cured.

Figure 6:
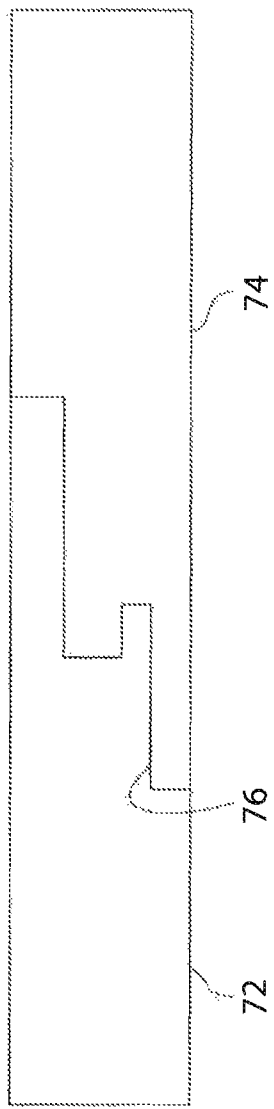
FIG. 6 is a schematic representation of a further embodiment of the end of a carbon fiber strip of the beam of FIG. 1.

FIG. 6 is a further representation of a small strip of glass fiber 72 being joined to the end of a strip of unidirectional carbon fiber 74 by a splice 76. In FIG. 6, the splice 76 has a randomly interspersed configuration. The small strip of glass fiber 72 is joined to the strip of unidirectional carbon fiber 74 along the splice 76 by co-curing.

In each of the examples represented in FIGS. 3-6, because the small fiberglass strip added at attachment areas of the beam is not galvanicly active, galvanic corrosion of metal structures in the aircraft to which the beam is attached is avoided. In each of the examples, the splice added between the strip of glass fiber and the strip of unidirectional carbon fiber will be positioned at different locations in each layer of the beam adjacent the terminal end of the beam.

As various modifications could be made in the construction of the beam and its method of construction herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A structural component for an aircraft, the structural component comprising:
   a beam having a length extending in a longitudinal direction between a first terminal end of the beam and a second terminal end of the beam, the beam having a width extending in a lateral direction across the beam;
   a first plurality of strips of composite material on the beam, the first plurality of strips of composite material extending along the length of the beam, the first plurality of strips of composite material being comprised of strips of glass fibers;
   a second plurality of strips of composite material on the beam, the second plurality of strips of composite material extending along the length of the beam, the second plurality of strips of composite material being comprised of strips of unidirectional carbon fibers where the carbon fibers are only oriented in alignment with the length of the beam; and, a third plurality of strips of composite material on the beam, the third plurality of strips of composite material being on the beam adjacent the first terminal end of the beam and the second terminal end of the beam, the third plurality of strips of material being comprised of glass fibers, the third plurality of strips of composite material being connected to opposite ends of the second plurality of strips of composite material at the first terminal end of the beam and the second terminal end of the beam.

2. The structural component of claim 1, further comprising:

the first plurality of strips of composite material comprising strips of glass fibers on the beam oriented at an angle of +45° relative to the longitudinal direction of the length of the beam;

the first plurality of strips of composite material comprising strips of glass fibers on the beam oriented at an angle of −45° relative to the longitudinal direction of the length of the beam;

the first plurality of strips of composite material comprising strips of glass fibers on the beam oriented at an angle of 90° relative to the longitudinal directional of the length of the beam; and, the second plurality of strips of composite material comprising strips of unidirectional carbon fibers on the beam oriented at an angle of 0° relative to the longitudinal direction of the length of the beam.

3. The structural component of claim 2, further comprising:

the strips of unidirectional carbon fibers all having carbon fibers oriented at 0° relative to the longitudinal directional of the length of the beam.

4. The structural component of claim 2, further comprising:

no strips of the strips of unidirectional carbon fibers have carbon fibers that are oriented at an angle relative to the longitudinal direction of the length of the beam.

5. The structural component of claim 2, further comprising:

the plurality of unidirectional carbon fibers are oriented only in the longitudinal direction along the length of the beam.

6. The structural component of claim 2, further comprising:

the beam having an upper flange, the upper flange having a horizontal orientation, the upper flange having a length that extends between the first terminal end of the beam and the second terminal end of the beam, and the upper flange having a width that extends across the width of the beam;

the beam having a lower flange, the lower flange having a horizontal orientation, the lower flange having a length that extends between the first terminal end of the beam and the second terminal end of the beam, and the lower flange having a width that extends across the width of the beam;

the beam having a central web, the central web having a vertical orientation, the central web having a length that extends between the first terminal end of the beam and the second terminal end of the beam, and the central web having a height that extends between the upper flange and the lower flange.

7. The structural component of claim 6, further comprising:

the strips of the second plurality of strips have first and second terminal end portions on the beam adjacent the first and second terminal ends of the beam, respectively; and, the first terminal end portions and the second terminal end portions are comprised of glass fiber.

8. The structural component of claim 7, further comprising:

the first terminal end portions extend entirely across the width of the beam adjacent the first terminal end of the beam;

the first terminal end portions are connected by splices to the strips of unidirectional carbon fibers adjacent the first terminal end of the beam; and, a proportion of the terminal end portions extending across the width of the beam decreases and a proportion of the strips of unidirectional carbon fiber extending across the width of the beam increases as the splices extend from the first terminal end of the beam toward the second terminal end of the beam.

9. The structural component of claim 8, further comprising:

the second terminal end portions extend entirely across the width of the beam adjacent the second terminal end of the beam;

the second terminal end portions are connected by splices to the strips of unidirectional carbon fibers adjacent the second terminal end of the beam; and, a proportion of the second terminal end portions extending across the width of the beam decreases and a proportion of the strips of unidirectional carbon fibers extending across the width of the beam increases as the splices extend from the second terminal end of the beam toward the first terminal end of the beam.

10. The structural component of claim 1, further comprising:

the beam having an eye-beam cross-section configuration.

11. The structural component of claim 1, further comprising:

the beam being constructed from two back to back composite channels.

12. A structural component for an aircraft, the structural component comprising:

a beam having a length extending in a longitudinal direction between a first terminal end of the beam and a second terminal end of the beam, and having a width extending in a lateral direction across the beam;

a first strip of composite material on the beam, the first strip being comprised of glass fibers that are oriented at an angle relative to the longitudinal direction along the length of the beam;

a second strip of composite material on the beam, the second strip extending along the length of the beam, the second strip being comprised of unidirectional carbon fibers that are oriented in the longitudinal direction along the length of the beam;

a third strip of composite material on the beam, the third strip being comprised of glass fibers that are oriented at an angle relative to the longitudinal direction along the length of the beam;

the second strip being sandwiched between the first strip and the third strip with the first strip and the third strip shielding the second strip from an exterior environment of the beam;

the second strip has a length that extends along, the length of the beam between the first terminal end of the beam and the second terminal end of the beam, the second strip has an intermediate portion on the beam and first and second terminal end portions on the beam adjacent the first and second terminal ends of the beam, respectively; and, the intermediate portion of the second strip is comprised of carbon fibers and the first terminal end portion and the second terminal end portion of the second strip are comprised of glass fibers.

13. The structural component of claim 12, further comprising:

the second strip being one of a plurality of second strips on the beam that are comprised of unidirectional carbon fibers that are oriented in the longitudinal direction along the length of the beam; and, no strips of the plurality of second strips comprised of unidirectional carbon fibers have carbon fibers oriented at an angle relative to the longitudinal direction along the length of the beam.

14. The structural component of claim 12, further comprising:

the second strip being one of a plurality of second strips on the beam that are comprised of unidirectional carbon fibers; and, the unidirectional carbon fibers in the plurality of second strips are oriented only in the longitudinal direction along the length of the beam.

15. The structural component of claim 12, further comprising:

an upper flange of the beam, the upper flange having a horizontal orientation, the upper flange having a length that extends between the first terminal end of the beam and the second terminal end of the beam, and the upper flange having a width that extends across the width of the beam;

a lower flange of the beam, the lower flange having a horizontal orientation, the lower flange having a length that extends between the first terminal end of the beam and the second terminal end of the beam, and the lower flange having a width that extends across the width of the beam;

a central web of the beam, the central web having a vertical orientation, the central web having a length that extends between the first terminal end of the beam and the second terminal end of the beam, and the central web having a height that extends between the upper flange and the lower flange.

16. The structural component of claim 12, further comprising:

the beam having an eye-beam cross-section configuration.

17. The structural component of claim 12, further comprising:

the beam being constructed from two back to back composite channels.

18. A structural corn orient for, an aircraft the structural component comprising:

a beam having length extending in a longitudinal direction between a first terminal end of the beam and a second terminal end of the beam, and having a width extending in a lateral direction across the beam;

a first strip of composite material on the beam, the first strip being comprised of glass fibers that are oriented at an angle relative to the longitudinal direction along the length of the beam;

a second strip of composite material on the beam, the second strip extending along the length the beam, the second strip being comprised of unidirectional carbon fibers that are oriented in the longitudinal direction along the length of the beam;

a third strip of composite material on the beam, the third strip being comprised of glass fibers that are oriented at an angle relative to the longitudinal direction along the length of the beam;

the second strip being sandwiched between the first strip and the third strip with the first strip and the third strip shielding the second strip from an exterior environment of the beam;

an upper flange of the beam, the upper flange having a horizontal orientation, the upper flange having a length that extends between the first terminal end of the beam and the second terminal end of the beam, and the upper flange having a width that extends across the width of the beam;

a lower flange of the beam, the lower flange having a horizontal orientation, the lower flange having a length that extends between the first terminal end of the beam and the second terminal end of the beam, and the lower flange having a width that extends across the width of the beam; and, a central web of the beam, the central web having a vertical orientation, the central web having a length that extends between the first terminal end of the beam and the second terminal end of the beam, and the central web having a height that extends between the upper flange and the lower flange;

the second strip has a length that extends along the length of the beam between the first terminal end of the beam and the second terminal end of the beam, the second strip has an intermediate portion on the beam and first and second terminal end portions on the beam adjacent the first and second terminal ends of the beam, respectively; and, the intermediate portion of the second strip is comprised of carbon fibers and the first terminal end portion and the second terminal end portion of the second strip are comprised of glass fibers.

19. The structural component of claim 18, further comprising:

the first terminal end portion of the second strip extends entirely across the width of the beam adjacent the first terminal end of the beam;

the first terminal end portion of the second strip is connected by a splice to the intermediate portion of the second strip adjacent the first terminal end of the beam;

a proportion of the first terminal end portion of the second strip extending across the width of the beam decreases and a proportion of the intermediate portion of the second strip extending across the width of the beam increases as the splice extends from the first terminal end of the beam toward the second terminal end of the beam.

20. The structural component of claim 19, further comprising:

the second terminal end portion of the second strip extends entirely across the width of the beam adjacent the second terminal end the beam;

the second terminal end portion of the second strip is connected by a splice to the intermediate portion of the second strip adjacent the second terminal end of the beam; and,
a proportion of the second terminal end portion of the second strip extending across the width of the beam decreases and a proportion of the intermediate portion of the second strip extending across the width of the beam increases as the splice extends from the second terminal end of the beam toward the first terminal end of the beam.

* * * * *

UNITED STATES PATENT AND TRADEMARK OFFICE
CERTIFICATE OF CORRECTION

PATENT NO. : 10,131,417 B2
APPLICATION NO. : 15/495152
DATED : November 20, 2018
INVENTOR(S) : Kismarton et al.

Page 1 of 1

It is certified that error appears in the above-identified patent and that said Letters Patent is hereby corrected as shown below:

In the Claims

In Claim 18, Line 1, "corn orient for," is changed to --component for--.

Signed and Sealed this
Twenty-second Day of January, 2019

Andrei Iancu
*Director of the United States Patent and Trademark Office*